United States Patent [19]

Mezger

[11] Patent Number: 5,275,263

[45] Date of Patent: Jan. 4, 1994

[54] BRAKE BLOCK SHOE AND METHOD FOR ITS MANUFACTURE

[75] Inventor: Fritz Mezger, Muntelier, Switzerland

[73] Assignee: Maschinenfabrik & Eisengiesserei, Ed. Mezger AG, Switzerland

[21] Appl. No.: 23,141

[22] Filed: Feb. 24, 1993

Related U.S. Application Data

[63] Continuation of Ser. No. 680,804, Mar. 8, 1991, abandoned.

[51] Int. Cl.⁵ .............................................. F16D 69/00
[52] U.S. Cl. .................................. 188/251 A; 188/255; 188/258; 164/93; 164/95
[58] Field of Search .................... 188/250; 164/93-; 192/111

[56] References Cited

U.S. PATENT DOCUMENTS

| | | | |
|---|---|---|---|
| 410,989 | 9/1889 | Pollock | 188/255 |
| 818,300 | 4/1906 | Sargent | 164/95 |
| 907,780 | 12/1908 | Glennon | 188/255 |
| 1,197,859 | 9/1916 | Rojekof | 164/93 |
| 1,423,654 | 7/1922 | Engel | 164/96 |
| 1,941,672 | 1/1934 | Fahrenwald | 188/251 M |
| 2,392,291 | 9/1918 | Peycke et al. | 188/242 |

FOREIGN PATENT DOCUMENTS

| | | | |
|---|---|---|---|
| 564077 | 10/1958 | Belgium | 188/251 M |
| 0026578 | 4/1981 | European Pat. Off. | |
| 791041 | 6/1936 | France | |
| 989079 | 9/1951 | France | |
| 248674 | 2/1948 | Switzerland | |
| 301328 | 8/1952 | Switzerland | |
| 255218 | 7/1926 | United Kingdom | |
| 403014 | 12/1933 | United Kingdom | |

Primary Examiner—Robert J. Oberleitner
Assistant Examiner—Lee W. Young
Attorney, Agent, or Firm—Ostrolenk, Faber, Gerb & Soffen

[57] ABSTRACT

The back and the braking body of the brake shoe are both formed as cast iron elements. The brake shoe, mainly consisting of molded parts, allows a particularly rational manufacture by casting operations or as a composite casting in one and the same casting mold, the casting mold being divided into casting cavities for the back and the braking body by a steel sheet. Cast-in steel reinforcements may be provided as well.

8 Claims, 3 Drawing Sheets

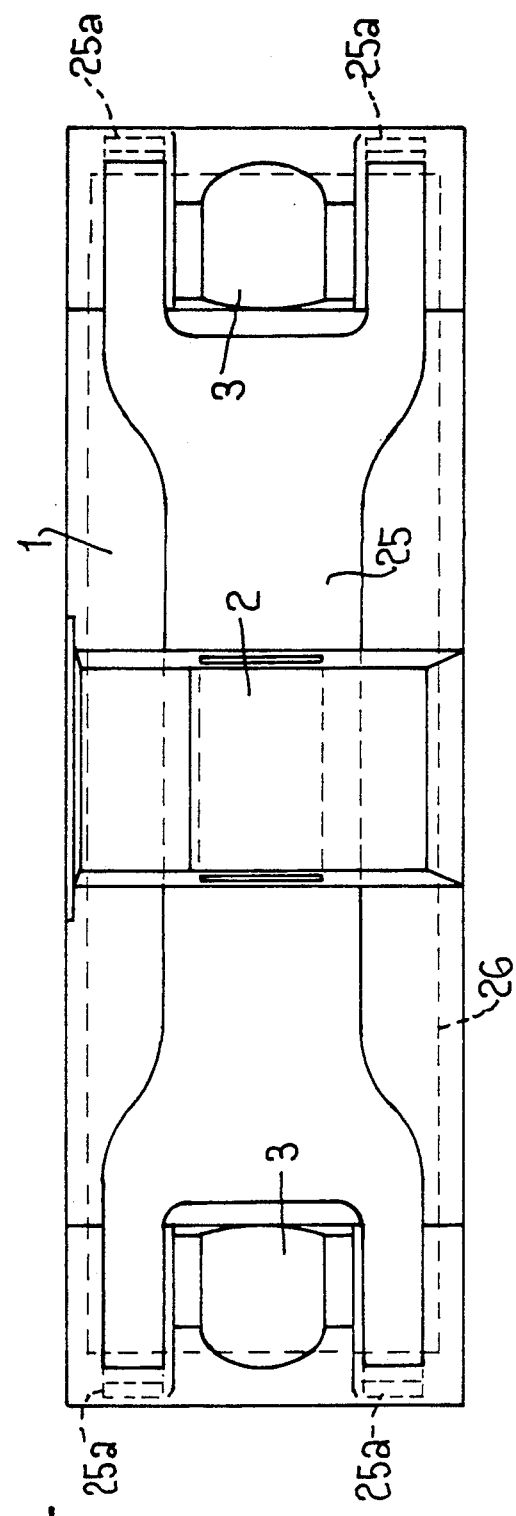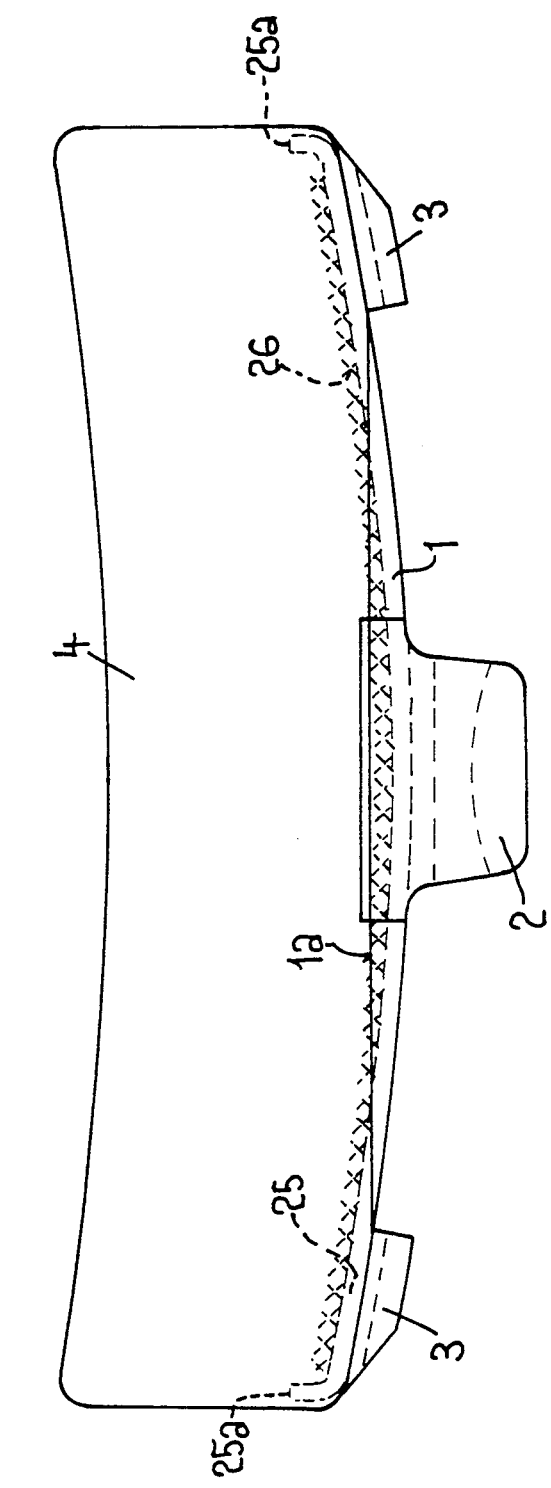

BRAKE BLOCK SHOE AND METHOD FOR ITS MANUFACTURE

This is a continuation of application Ser. No. 07/680,804 filed on Mar. 8, 1991, now abandoned.

The present invention refers to a brake block shoe, hereinafter referred to as a brake shoe, comprising a back for its attachment to a holder and, secured to said back, a braking body of cast iron having a high friction coefficient, said back being a cast iron part as well. Such brake shoes are known and are used in particular for the brakes of locomotives and railroad cars. Today a cast iron having a high phosphorus content is often preferred for the braking body since this has different advantages with respect to the friction coefficient and the wear resistance. The low stability of this cast iron, however, is disadvantageous and requires a strong reinforcement in order to reduce the risk of breakage, on one hand, and on the other hand, to hold the individual pieces together in the event of a fracture and thus to prevent fragments from disengaging and injuring people e.g. in a train station. Such an embodiment is known e.g. from EP-A-O 026 578. The brake shoes disclosed in this publication are provided with a steel back of about 3 mm thickness having a reinforcement secured thereto. This embodiment has various drawbacks.

It is also known to manufacture the back and the braking body as molded parts which are connected by means of conical lugs extending in openings (U.S. Pat. No. 2,392,291). Actually, both molded parts have to be cast separately, i.e. after its preparation, one of the molded parts must be inserted into the casting mold for the other one, resulting in an expensive manufacture. Nevertheless, the connection of the two molded parts is not ideal, and fragments of the brittle braking body may still be loosened from the back and fall off. Moreover, there is no true connection between the two molded parts, so that fragments of the brittle braking body may be detached and hurled away in the event of a breakage.

It is the object of the present invention to avoid the mentioned drawbacks. This object is attained by means of a brake shoe wherein said braking body and said back are directly or indirectly welded together.

The fact that said back and said braking body are directly or indirectly welded together results in a secure connection and cohesion between the two parts at their junction in such a manner that even small fragments of the brittle braking body cannot be loosened from the back and fall off. As will be discussed hereinbelow, the manufacture may be considerably simplified and thus becomes more economical. A possible reinforcement between the back and the braking body may be kept thin and does not substantially reduce the useful thickness of the braking body. As mentioned, the welding between the back and the braking body may be effected directly, or a steel sheet may be interposed between those parts, said parts being welded to said steel sheet.

Another object of the invention is to provide a method for the manufacture of the brake shoe of the invention. This object is attained by a method wherein said back and said braking body are poured as a composite casting in the same mold in consecutive or simultaneous casting operations. This procedure allows a particularly economical manufacture.

The invention is now explained in more detail with reference to several examples.

FIG. 4 shows a rear view of another embodiment of the brake shoe of the invention; and FIG. 5 shows a side elevation of the brake shoe of FIG. 4.

Figures 1, 2:
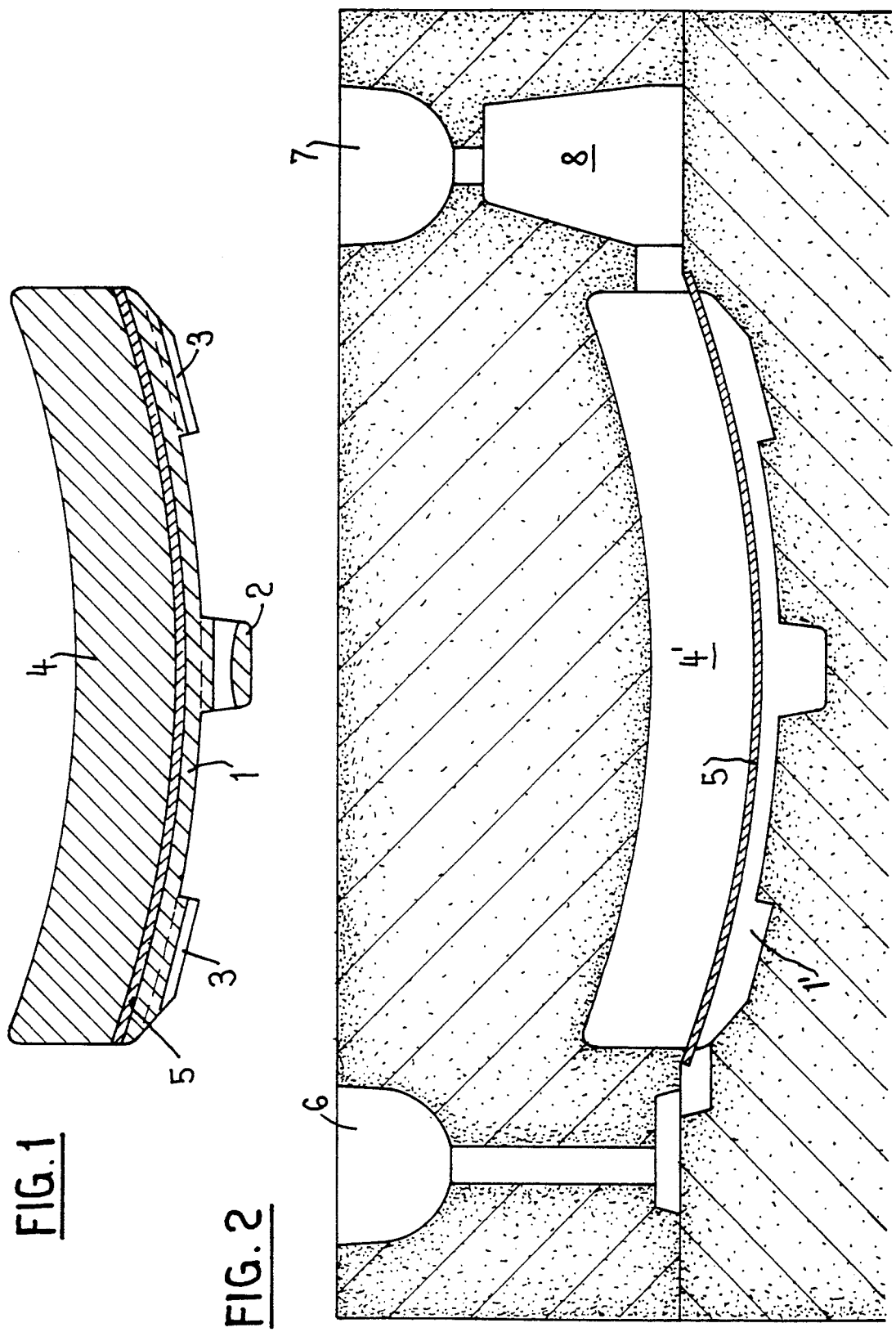
FIG. 1 shows a longitudinal section of a brake shoe according to the invention.
FIG. 2 shows a first example of a casting mold.

The brake shoe according to FIG. 1 comprises a back 1 of cast iron, e.g. unalloyed gray cast iron or nodular cast iron, provided with a lug 2 and cams 3 for securing the back, respectively the entire brake shoe to a holder of the brake assembly. The brake shoe further comprises a braking body 4 of cast iron having a high phosphorous content and good braking properties. Parts 1 and 4 are directly or indirectly welded together in an area 5. Area 5 is formed of a steel sheet separating parts 1 and 4 during the casting operation, which however has been strongly carbonized on both sides during said casting operation and welded together with cast bodies 1 and 4.

FIG. 2 illustrates a mold for the manufacture of the brake shoe according to FIG. 1. The lower mold portion accommodates the casting cavity 1' for the back, while the casting cavity 4' for the braking body 4 is provided in the upper mold portion. A separating steel sheet 5 is disposed between the two casting cavities, the somewhat projecting edges of which are anchored in the sand of the two mold portions and provide a secure separation of the casting cavities. The gate of the lower part of the mold is located below the sheet 5 while the gate of the upper part of the mold lies above the sheet. FIG. 2 further shows the feeding heads 6 and 7 as well as the feeder 8 of the upper part of the mold, which is associated to casting cavity 4'. As indicated in FIG. 2, the mold partition by sheet 5 is not horizontal but rather curved in parallel with the outer radius in such a manner that the bottom mold portion is only about 5 to 10 mm thick. Separating sheet 5 has a thickness of 1 to 2 mm. After unmolding the brake shoe, the projecting edge of separating sheet 5 has to be cut off.

The separating sheet 5 need not project at the edges if the lower or the upper part is made somewhat narrower. Besides, the mold partition by sheet 5 may also be horizontal if a shell-shaped or cradle-shaped steel insert with plane edges is used instead of a flat separating sheet.

The casting is effected in two steps. First, the lower part is poured with the appropriate casting alloy. Shortly afterwards, the upper part is poured using an iron with a high phosphorous content. Pouring may also take place almost simultaneously. The separating steel sheet is thereby carbonized enough to achieve a sufficient welding and mutual cohesion of the lower part, i.e. the back 1, and the upper part, i.e. the braking body 4. In addition, this prevents any damages of the tire of the braked wheel by the steel insert in cases where the brake shoe is exceptionally worn down to the steel insert.

Figure 3:
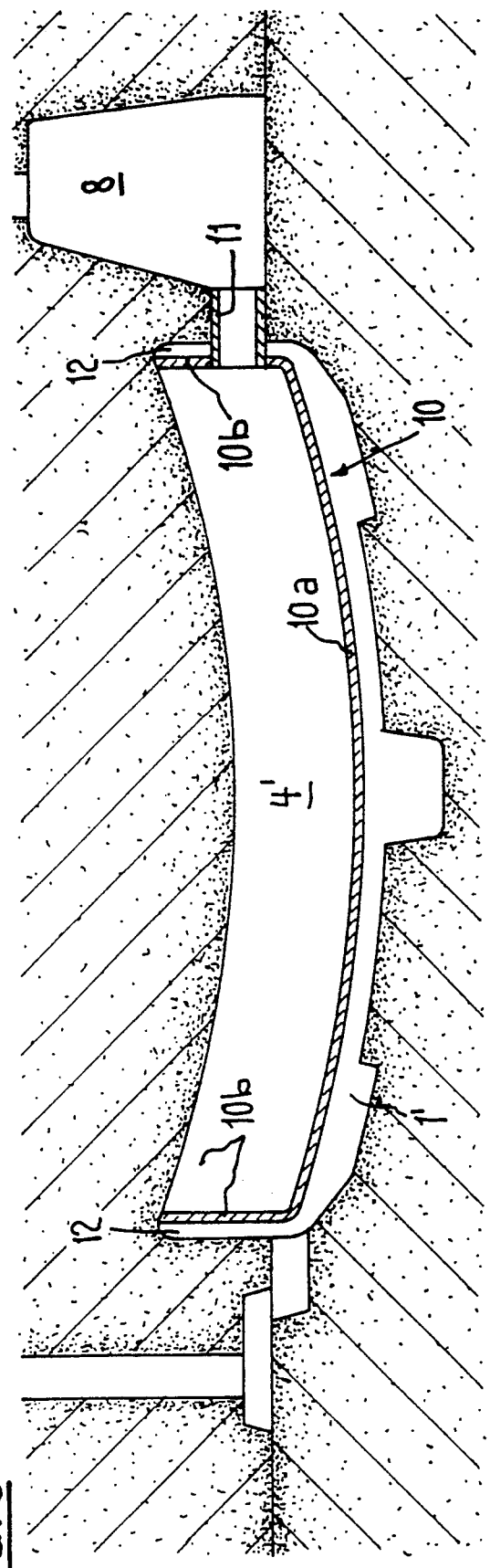
FIG. 3 shows a second example of a casting mold.

FIG. 3 shows a casting mold similar to that of FIG. 2, and corresponding parts are referenced accordingly. Instead of a flat separating sheet 5 according to FIG. 2, a box-shaped separating shell 10 having a bottom 10a and circular side walls 10b is provided in this case. Here, the braking body 4 is poured into said shell 10, namely through a hollow core extending through an opening of one of the side walls of shell 10. This allows the rational manufacture of a brake shoe the braking body of which is externally surrounded by a rib of the back which is produced in the cavities 12. The casting leaves no projecting steel members to be subsequently removed as in the embodiment according to FIG. 2.

Different variants are possible, and measures which are only described with respect to a given embodiment are analogically applicable for another. Thus, the back may in all cases be reinforced by an additional steel insert, or the braking body may or may not be subdivided by transversal incisions, if desired. The shell according to FIG. 3 may be lowered so that its walls do not extend to the exterior of the braking body. Further, the degree of carbonization of the inserted shell is a matter of choosing the casting parameters in such a manner as not to influence the braking properties of the brake shoe unfavorably. Other cast iron alloys than those described above may be used. In the previous examples, it is assumed that the back is poured first, and then the braking body. However, the procedure might be reversed, in which case the braking body is preferably cast in the lower mold portion, and the back in the upper mold portion. Both parts can be cast at the same time as well.

In the embodiment of FIG. 3, the narrow sides of shell 10 might possibly be omitted.

As mentioned, the brake shoe can advantageously be manufactured as a composite casting by casting the back and the braking body simultaneously or at a short interval. This procedure is also possible, and simpler, of course, without the separating sheet 5 or the separating shell 10 In this case, the back is therefore cast first in a single mold and using an appropriate material, e.g. gray cast iron or nodular cast iron, and the braking body is directly cast onto the latter after a short delay of e.g. 5 to 10 s. It is possible here to obtain a solid molten or welded connection of the two parts without any substantial mixture occurring. However, in this case, it is not possible to give the inside of the back its usual concavely vaulted shape since the metal level of the casting in the undivided mold is flat, of course. Yet it has been found that this is no disadvantage even if the back does not extend all the way to the narrow sides of the casting cavity, respectively of the subsequently cast braking body. Thus, for example, a back of nodular cast iron or pearlitic gray cast iron having a maximum thickness of about 12 mm is cast, which does not extend all the way to the end of the mold in the longitudinal direction. Then, the braking body is cast using a cast iron with a high phosphorous content, whereby a fusion and welding of the two cast parts is produced without the occurence of an inadmissible mixture thereof, only the separating surface of the previously poured part being liquid if the timing is correct.

FIGS. 4 and 5 illustrate such an embodiment, corresponding elements being referenced as in the shorter than braking body 4. Said back is cast first, using a measured quantity, and therefore its surface 1a is flat. The braking body is poured on top of said back in the described manner immediately after the casting of the latter and is thus welded thereto. Conversely, it might be advantageous first to cast the braking body and then the back in the same mold, in which case the cooling is slower due to the greater mass of the braking body, and the pouring of the back can be delayed some more. A reinforcement consisting of a steel sheet 25 with upwardly bent edges 25a and a grid 26 is provided, its central area extending mainly in the back while its end portions extend in the braking body, thus offering a secure connection of these parts and a high stability. According to FIG. 4, the steel sheet 25 is tapered in the middle and forked at the ends. The cams 3 are formed by the cast iron of the braking body 4, but they are solid enough for the existing stresses. If the back is made of nodular cast iron, the reinforcement may be omitted altogether.

What I claim is:

1. A method for producing a brake shoe comprising a back of a first type of cast iron and a braking body of a second type of cast iron secured to said back and having a high friction coefficient, comprising:

providing a single mold having a casting cavity, casting into this casting cavity a first quality of the first type cast iron to a level thereby forming said cast iron back having a flat upper surface of said level, casting into said first quantity of cast iron a second quantity of the second type of cast iron thereby filing said mold cavity to form said braking body, said second quantity of cast iron having a high phosphorus content and thus a high friction coefficient and being cast after casting said first quantity of cast iron so that said first and second quantities of cast iron are welded together at said surface of said cast iron back and firmly secured to each other.

2. A method according to claim 1, wherein said second quantity of cast iron is cast of 5 to 10 seconds after casting of said first quantity of cast iron.

3. A method according to claim 1, wherein said back is cast with modular cast iron.

4. A method according to claim 1, wherein a steel plate is put into said mold before casting, said plate being partly above and partly below said level, and said plate having apertures allowing a flow of cast iron through said apertures.

5. A method for producing a brake shoe comprising a back of a first type of cast iron and a braking body of a second type of cast iron secured to said back and having a high friction coefficient, comprising:

providing a single mold having a casting cavity, casting into this casting cavity a first quantity of the second type of cast iron to a level thereby forming a cast iron braking body having a flat upper surface at said level, casting onto said first quantity of cast iron a second quantity of the first type of cast iron thereby filling said mold cavity to form said back, said second quantity of cast iron being cast after casting said first quantity of cast iron so that said first and second quantities of cast iron are welded together at said surface of said braking body and firmly secured to each other.

6. A method according to claim 5, wherein said second quantity of cast iron is cast of 5 to 10 seconds after casting of said first quantity of cast iron.

7. A method according to claim 5, wherein said back is cast with modular cast iron.

8. A method according to claim 5, wherein a steel plate is put into said mold before casting, said plate being partly above and partly below said level, and said plate having apertures allowing a flow of cast iron through said apertures.

* * * * *